INVENTORS
Louis J. Umile
William J. Fitzgerald
BY
AGENT

3,173,088
VIBRATING REED ELECTRICAL FREQUENCY RESPONSIVE DEVICE USING SELF SUPPORTING COIL
Louis J. Umile, New Haven, and William J. Fitzgerald, West Haven, Conn., assignors to J-B-T Instruments, Inc., New Haven, Conn., a corporation of Connecticut
Filed Apr. 11, 1960, Ser. No. 21,394
6 Claims. (Cl. 324—80)

This invention relates to electrical devices of the frequency-responsive type, and more particularly to frequency-responsive instruments wherein a movable armature member of magnetic material is subjected to a magnetic flux produced by an electrical coil.

The invention is embodied in an electrical frequency measuring or indicating instrument of the type known as a frequency meter. However, the invention is not limited to the specified structure disclosed and described, being instead more properly defined by the appended claims.

Heretofore, in the manufacture and fabrication of electrical frequency meters it has been the common practice to wind the exciting or driving coil on an insulating form or bobbin, by which the convolutions of fine wire of the coil were supported and maintained out of contact with metallic structural elements or components which could damage the winding and/or cause short circuit. Such bobbin wound and supported coil was then mounted on a suitable bracket or equivalent structure, as by securing a flange of the bobbin to said bracket in the desired operative position.

Associated with the bobbin-mounted and supported coil was a magnetic pole piece and permanent magnet structure, together with a bank or set of vibratable reeds, the latter having magnetic flux induced in them by the pole and magnet structure, whereby upon suitable energization of the driving coil the reeds would be subjected to reactive oscillating forces. The one reed which had a resonant period equal to the frequency of the energy impressed upon the driving coil would exhibit the maximum amplitude of vibration, thereby indicating the frequency of the coil excitation.

The magnetic poles and permanent magnets, together with the bank or set of reeds all required support in proper operative positions, both with relation to themselves and also with relation to the driving coil. Not only was such supporting means required to hold the various associated components in the required relative positions, but the supporting means had to be sufficiently sturdy and adequate to minimize the effects of vibration whereby there could occur no undesired displacement of parts which might render inoperative the frequency meter.

The provision and use of such supporting means involved additional parts and assembly operations, which increased appreciably the cost of the instrument. Further there was always the possibility of incorrect or improper assembly, or subsequent malfunctioning of the supporting structure, which added to the cost of the meter and constituted a factor which had to be taken into consideration in connection with reliability of the device and the useful life of the same.

In accordance with the present invention there is obviated the necessity for most of the separate supporting parts or components previously used and which required individual attachment and assembly in order to effect a mounting of the driving coil, the magnetic pole pieces, the permanent magnets, and the assembled bank or set of vibratable reeds. Instead, as provided by the invention, a novel and effective multi-function single supporting means or member is utilized which provides an effective and desirable mounting of the driving coil, the pole pieces and the permanent magnets, doing away with individual parts and assembly operations heretofore associated with the above-listed components. The said single member or mounting means not only eliminates the multiplicity of mounting structures or components and the associated assembly operations required but also has other important advantages by which there is produced a greatly improved frequency responsive instrument, as will now be briefly outlined.

By the invention, the single supporting means is constituted of a block of insulating plastic substance such as epoxy resin, phenolic resin or other suitable substance adaptable for a casting procedure or equivalent process by which individual components may be embedded, surrounded and supported in desired relative positions. By the invention, not only is the exciting or driving coil completely embedded in the plastic substance, but as well the pole pieces and permanent magnet means, together with simple supporting posts or the equivalent which are common to all the above, thereby to provide a sealed, unitary, magnetic-flux-providing assemblage. Preferably the driving coil is of the bobbinless type, that is, it is not supported on a carrier means or form but instead is of the self-supporting kind even though the convolutions are of very fine wire. Also, preferably the terminals to which the ends of the coil are secured are also embedded in the plastic block. The embedding of the said components may be advantageously carried out by casting process, utilizing a suitable epoxy or phenolic resin or the equivalent.

By such organization not only is there greatly simplified the assemblage of the components and eliminated a number of supporting parts, but other advantages are had with respect to moisture resistance, resistance to vibration and shock, absence of relative movement, permanence of the components, and improved insulating properties.

Accordingly, an object of the invention is to provide a novel and improved electrical frequency-responsive device wherein there is eliminated to the maximum possible extent individual conventional supporting parts and structures in an instrument characterized by clearances which are mostly not highly critical, together with the accompanying assembly operations while at the same time providing a unitary, improved and encapsulating type supporting structure which replaces separate supporting components and reduces assembly time to the greatest possible extent.

A further object of the invention is to provide a novel and improved electrical frequency responsive device in accordance with the foregoing, wherein the magnetic flux providing assemblage is constituted as a sealed, unitary group, and wherein adjustable positioning of the said sealed unitary group with respect to the movable armature means or reeds is easily possible, thereby to enable a control of the amplitude of movement of the armature or reeds to be effected.

A feature of the invention resides in the provision of a novel supporting means as above set forth, which eliminates conventional supports in a frequency responsive device as characterized, said supporting means being in the form of an encapsulating insulating plastic substance which provides the maximum degree of moisture and corrosion resistance, and which effectively prevents relative movement of the embedded components whereby a more rigid, vibration and shock resistant instrument is produced, characterized by a high degree of permanency.

Still another feature of the invention resides in the provision of an improved electrical frequency responsive device having components including the driving coil which are embedded in a plastic substance for their sole support, wherein the coil is of the bobbinless type and yet has many turns of fine wire in its make-up, the plastic material of the block being contiguous with the inner and outer sides of the coil and also with the two coil ends whereby all coil convolutions are firmly anchored and fixed against any possible movement.

Other features and advantages will hereinafter appear.

In the drawings accompanying this specification, similar characters of reference have been used to designate like components throughout the several views, in which.

Figure 1:
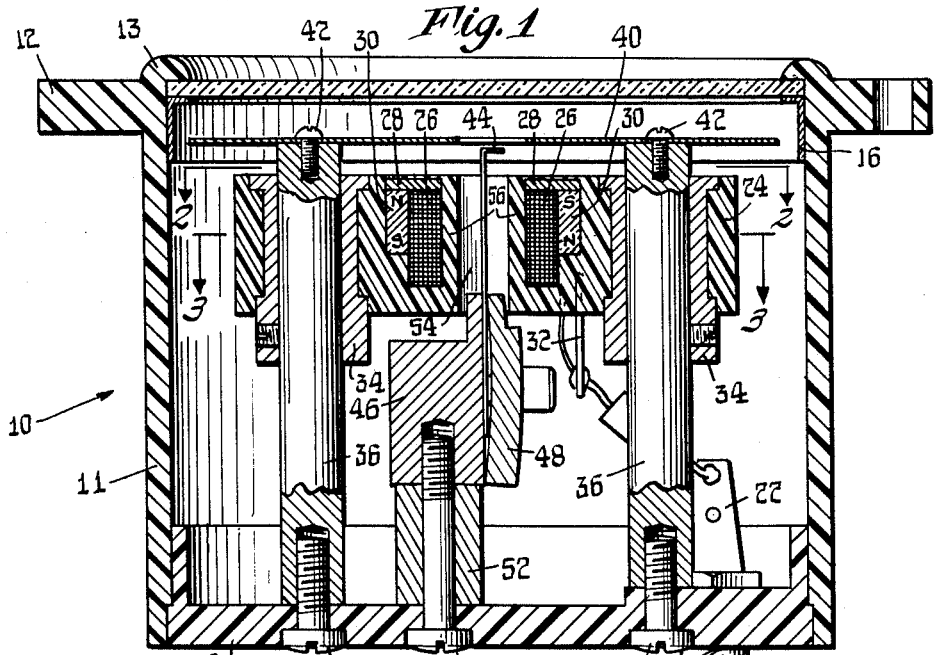
FIG. 1 is an axial sectional view through a frequency meter embodying the invention.

Referring first to FIG. 1, the meter illustrated therein as embodying the invention comprises a conventional type instrument casing 10 having cylindrical side walls 11 and an annular mounting flange 12 at its front end together with a window-retaining bezel 13 adjoining the flange 12. The case 10 includes a transparent window 15 which is retained in place by the usual flanged frame 16 press-fitted into the case and secured in any suitable manner. The case 10 also has a removable rear transverse supporting wall 18, on which the instrument movement is mounted and supported. Projecting from the rear of the transverse wall 18 are terminal screws 20, said screws having at the interior of the wall connector lugs 22 in the usual manner.

In accordance with the present invention there is provided, as illustrated in FIGS. 1–4, a novel insulating support means which eliminates a multiplicity of conventional supports such as coil bobbins, formed brackets, screws or rivets, connector pieces and the like, together with the associated assembly operations. Instead the operative components of the magnetic flux providing means of the meter, comprising the driving coil, pole pieces and magnets and, if desired, coil terminal connectors, are all supported by a single means which not only rigidly holds the said components in their proper related position but also provides a sealed, unitary group which is resistant to corrosion, moisture, corrosive gases and fluid, vibration and shock and which provides excellent electrical insulation and permanent positioning of all portions, even including the convolutions of fine wire of the driving coil. Moreover, the said supporting means enables a relative adjustment of the said flux providing assemblage to be readily effected with respect to the movable armature or reed assemblage of the instrument.

As shown, the said supporting means comprises an encapsulating insulating plastic block 24 which may be constituted of any suitable plastic or resinous substance such as epoxy resin, phenolic resin and the like. Embedded in the plastic block 24 is a driving or exciting coil 26 which is shown as being of the bobbinless type whereby the coil convolutions are self-supporting and do not depend on any coil form whatsoever to hold the shape of the coil, aside from the encapsulating block 24 itself. Also embedded in the block 24 are flat elongate strips 28 of magnetic material, constituting pole pieces, together with other flat elongate strips 30 comprising permanent magnets of magnetic material such as Alnico V.

Also, as shown in FIG. 1, terminal strips or connectors 32 are preferably embedded in the insulating block 24, to which strips the ends of the driving coil 26 are attached.

Figure 2:
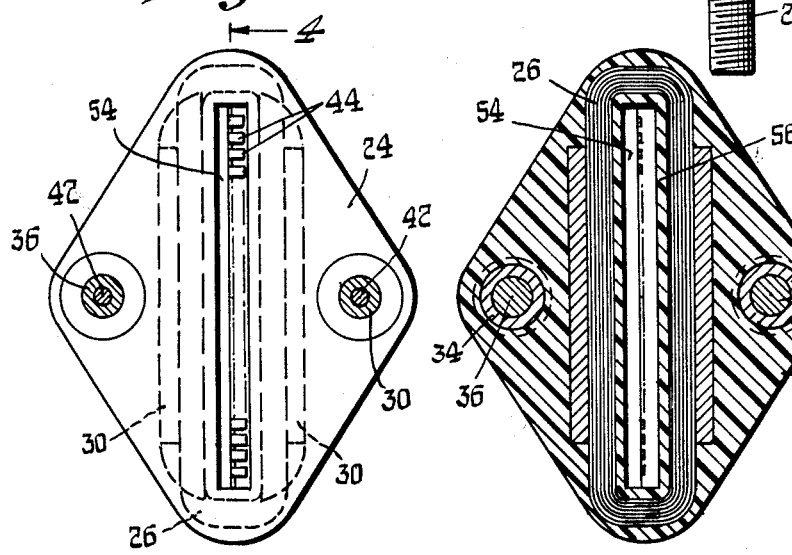
FIG. 2 is a transverse sectional view, taken on the line 2—2 of FIG. 1.
Figure 3:
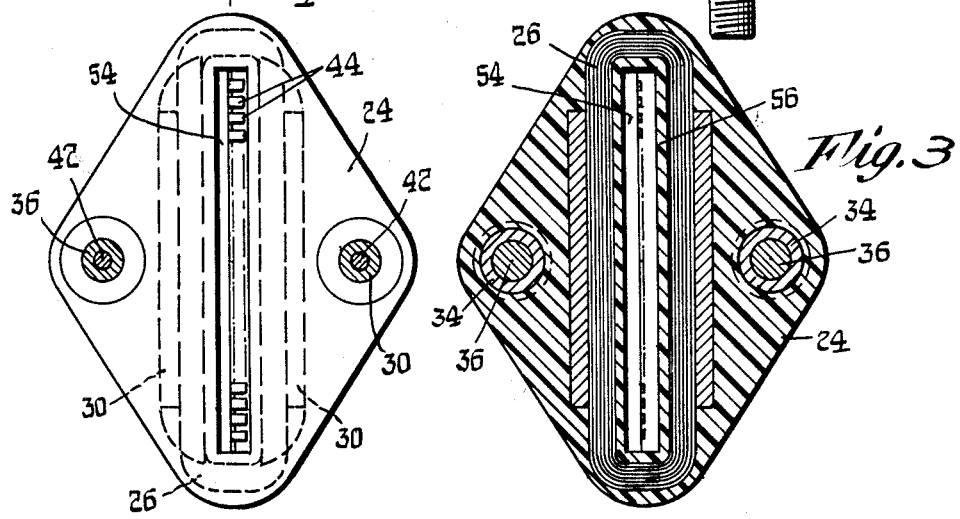
FIG. 3 is a transverse sectional view, taken on line 3—3 of FIG. 1.

For the purpose of supporting the insulating block 24 and the components embedded therein, it may have rigid carrier members 34 extended into it, said members being adapted to be secured to the rear transverse wall 18 of the instrument case 10. As seen in FIGS. 1, 2 and 3, the carrier members 34 are in the form of bushings or sleeves, through which supporting posts 36 extend, the said posts constituting the means for mounting the bushings 34 and consequently the encapsulating block 24 on the rear case wall 18. Such organization permits the block 24 and embedded bushings 34 to be adjustably positioned along the posts 36, as will be readily understood, and this constitutes a feature of the invention in that it enables relative adjusting movement to be effected between the magnets flux providing assemblage including the block 24, and the movable armature means or reeds of the instrument movement.

The posts 36 may be secured to the rear wall 19 in any suitable manner, as by screws 38 threaded into the posts as shown. At their forward ends the posts 38 project from the insulating block 24 and mount a dial plate 40 by means of screws 42.

As shown in FIG. 1, the terminal strips 32 to which the ends of the coil are attached may be connected to the terminal lugs 22 by suitable wire leads which may include appropriate resistor means, by which a circuit may be established through the coil 26, utilizing the terminal screws 20.

Figure 4:
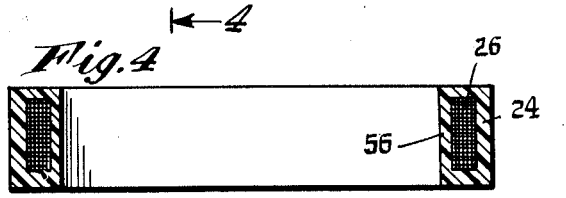
FIG. 4 is an axial sectional view, taken on the line 4—4 of FIG. 2.

In conjunction with the unitary magnetic flux providing assemblage comprising the coil 26, pole pieces 28, magnets 30 and carrier members 34 all embedded in the insulating block 24, a usual type of vibrating reed assemblage or movable armature means may be utilized. As shown in FIG. 1 such reed assemblage may comprise a plurality or bank of reeds 44 clamped between blocks 46 and 48, the block 46 being mounted, by means of screws 50 and bushings 52, the rear wall 18 of the instrument case 10. The reeds 44 are shown as extending through an elongate central opening 54 in the block 24, the two opposite, elongate sides of the said opening extending along and closely adjacent the elongate inside surfaces of the driving coil 26. As seen in FIGS. 3 and 4, all sides of the driving coil 26 are engaged by or contiguous with the plastic substance of the block 24. Referring to these figures, the block 24 is seen to have thin inner walls 56 bordering the oblong opening 54 and confining the coil convolutions at the inside of the coil.

In assembling the magnetic flux providing group comprising the coil 26, pole pieces 28, magnets 30 and the carrier members 34, the said components may be suitably supported in a cavity or recess in the desired relative positions, and the resinous casting substance may be poured into the said cavity whereby it will surround the components, permeating all cracks and crevices, and will solidify so as to produce the solid block 24. The coil 26 may, of course, be initially wound upon a suitable form which is thereafter removed, and the winding process may involve the use of a suitable adhesive substance by which the coil convolutions are adhered to each other to make the coil self-supporting whereupon it may be removed from the winding form as a bobbinless type coil.

It is now seen that a frequency responsive device as constructed in accordance with the invention and the foregoing description involves appreciably fewer supporting components, and eliminates conventional assembly operations whereby there is effected a desirable economy of manufacture. Moreover, the quality of the product is greatly improved, inasmuch as the embedment of the components in the plastic block provides a desirable resistance to moisture, corrosion, vibration, shock, elements such as salt air, corrosive fumes and the like. Also, the embedded components are permanently held in their proper relative positions, including the convolutions of fine wire of the coil, and a desirable high quality electrical insulation is effected. The entire assemblage is permanent in nature, rigid in its structure, and may be easily adjusted with respect to the reed assemblage, in order to regulate the amplitude of vibration of the reeds.

Variations and modifications may be made within the scope of the claims, and portions of the improvements may be used without others.

We claim:

1. A frequency-responsive device comprising a movable armature member of magnetic material; and a sealed, unitary, magnetic-flux providing assemblage disposed adjacent said armature member for effecting movement thereof, said assemblage comprising: a hollow and coreless electrical, multi-turn self-supporting driving coil of fine magnet wire the turns of which are adhered together to make them self-supporting and to constitute the coil as a unitary assemblage all portions of which are immovable with respect to each other said coil having a central through opening; a magnetic pole piece adjoining said driving coil; and a permanent magnet juxtaposed to said pole piece, said assemblage further comprising means constituting the sole support of said coil, pole piece and magnet, said support means consisting of a hollow block of insulating plastic substance characterized by a central through opening, in which block the coil, pole piece and magnet are embedded and held, said block having a thick-walled central tubular portion defining the said through opening and disposed within the coil to protect and support the inner turns thereof independently of any magnetic members over which the coil and flux-providing assemblage may be placed, and said support including a rigid carrier member insulated from the coil and extended into the said block, said carrier member being adapted for securement to a base common to the said armature member.

2. The invention as defined in claim 1, in which there are terminal members embedded in the said block and connected to the ends of the driving coil, said terminal members projecting from the block for attachment to a circuit by which energization of the coil can be effected.

3. The invention as defined in claim 1, in which there is an additional pole piece and an additional permanent magnet embedded in the insulating block, said pole pieces and magnets being disposed on opposite sides of the driving coil and the magnets being arranged to impart a north polarity to one pole piece and a south polarity to the other pole piece.

4. The invention as defined in claim 1, in which there is a second rigid carrier member extended into the said block and adapted to be secured to the said base, said carrier members being disposed on opposite sides of the driving coil, and said block having integral oppositely disposed, projecting anchorage portions in which the carrier members are located.

5. The invention as defined in claim 1, in which the carrier member comprises a bushing and in which there is a supporting post extending into the same, said bushing being adjustably carried by the supporting post whereby the flux-providing assemblage may be adjustably positioned with respect to the said armature member.

6. The invention as defined in claim 1, in which the coil is bobbinless, the plastic material of the said block being contiguous with the inner and outer sides of the coil, and with the two ends of the coil.

References Cited by the Examiner

UNITED STATES PATENTS

| 1,796,421 | 3/31 | Apple | 336—96 |
| 2,464,568 | 3/49 | Flynn | 336—83 |
| 2,552,999 | 5/51 | Pannell et al. | 336—96 |
| 2,681,588 | 6/54 | Dyner | 324—80 X |
| 2,793,293 | 5/57 | Ehrlinger et al. | 324—80 X |
| 2,836,905 | 5/58 | Goldsmith | 336—96 X |
| 2,875,419 | 2/59 | Lear | 336—83 |

FOREIGN PATENTS

| 159,723 | 4/05 | Germany. |
| 459,964 | 5/28 | Germany. |
| 144,122 | 3/31 | Switzerland. |
| 868,470 | 2/53 | Germany. |
| 1,063,705 | 8/59 | Germany. |

OTHER REFERENCES

"Plastic Embedded Circuits," article in Electronics, June 1950, pages 66–69.

WALTER L. CARLSON, *Primary Examiner.*

SAMUEL BERNSTEIN, LLOYD McCOLLUM,
*Examiners.*